Patented June 6, 1933

1,913,332

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

METHOD OF PREPARING DI-NAPHTHYL AMINES

No Drawing.    Application filed May 2, 1928. Serial No. 274,683.

My invention relates to methods of preparing substituted ammonia compounds, and it has particular relation to a method of preparing secondary aromatic amines.

One object of the invention is to provide a method of preparing compounds of the above designated class which is more economical to practice than the methods heretofore employed, and which results in exceptionally high yields of a relatively pure product. Other objects and advantages will be apparent as the description of the invention proceeds.

One method heretofore employed in the preparation of such secondary aromatic amines, as dinaphthylamines, consists in subjecting approximately equi-molecular proportions of a naphthol and a naphthylamine to heat and pressure in the presence of a condensing agent, such as anhydrous calcium chloride or hydrochloric acid. Another method, also frequently employed, consists in subjecting β-naphthol to heat and pressure in the presence of zinc ammonium chloride. The first of these methods is objectionable because naphthylamines constituting one of the primary ingredients employed in the reaction are relatively expensive to obtain, and in some cases the yield obtained is not entirely satisfactory. The second method is objectionable because of the formation of tarry masses in the autoclave employed as a container for the reacting materials, which are difficult to remove and purify.

My invention resides in the discovery that secondary aromatic amines, particularly dinaphthylamines, may be economically and readily manufactured by subjecting naphthols and ammonia to heat and pressure in an autoclave.

One particularly useful compound which may be prepared by this method is β-β-dinaphthylamine, which is prepared as follows:

Two mols of β-naphthol and 1.5 mols of ammonia (preferably anhydrous liquid ammonia) are placed in an autoclave and heated for a period of eight to fourteen hours. For best results, the temperature during this period should be maintained at 300° to 310° C. Of course, these temperatures are not the extreme temperatures which may be employed to obtain a β-β-dinaphthylamine, but temperatures within these limits give the most satisfactory yields, and, also, the highest grade of product. During the period of heating in the autoclave, the pressures obtained range from approximately 650 pounds per square inch at the beginning, to as low as approximately 400 pounds per square inch near the conclusion of the reaction. These values, of course, depend somewhat on the relative size of the autoclave and the charge contained therein.

The reaction effected by this procedure can probably be represented by the following equation:

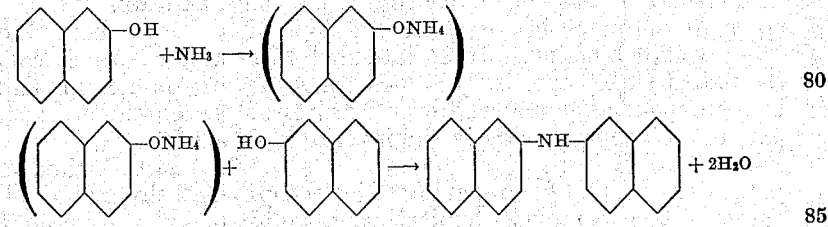

The reaction product is obtained upon cooling as a crystalline cake, which may readily be pulverized and which is of such purity that it may be used for many purposes without further treatment other than washing it with hot water. If a highly purified product is desired, the cake may be ground and then washed with approximately five times its own weight of a two to three percent solution of sodium hydroxide to remove any unreacted β-naphthol. The solution thus obtained is acidified, thereby precipitating the naphthol which may be contained therein. In most cases, the amount of this material will be very small. In order to remove any β-naphthyl amine that may be formed, the ground material is boiled with about four times its own weight of fifty percent alcohol and the solution is filtered off. Finally, the residue is dissolved in hot benzene. From the latter β-β-dinaphthylamine crystallizes out in the form of pale yellow plates having a melting point of 170° to 172° C.

It is to be understood that the invention is not limited to the manufacture of β-β-dinaphthylamine from β-naphthol, but it may also be employed for preparing various other secondary aromatic amines, such as the α-α-dinaphthylamine, or α-β-dinaphthylamine, merely by employing proper proportions of the corresponding aromatic hydroxides instead of of β-naphthol. If desired, aqueous ammonia may be substituted for anhydrous liquid ammonia, though, of course, the volume of ammonia used must be increased in proportion to the amount of water existing in the solution employed. The yields obtained with aqueous ammonia are not as high as those obtained by employment of non-aqueous or anhydrous ammonia, the latter giving almost quantitative yields.

From the preceding description, it will be apparent that the invention contemplates a relatively simple and inexpensive method of manufacturing various secondary aromatic amines. The product thus obtained is of an exceptionally high degree of purity and is satisfactory for many purposes without subjecting it to any expensive or difficult process of purification.

Although I have described in detail only the preferred embodiments of the invention, it will be apparent to those skilled in the art that the invention is not so limited, but that various minor modifications may be made therein without departing from the spirit of the invention or from the scope of the appended claims. It is intended that the patent shall cover by suitable expression in the appended claims whatever features of patentable novelty reside in the invention.

What I claim is:

1. A method of preparing dinaphthyl amines which comprises subjecting a liquid naphthol and ammonia to heat and pressure in the absence of a catalyst, the heating being to a temperature in the neighborhood of 300° C.

2. A method of preparing a naphthylamine which comprises heating a naphthol and ammonia under pressure and without the aid of a catalyst to a temperature in the neighborhood of 300° C.

3. A method of preparing dinaphthylamines which comprises subjecting a liquid naphthol and non-aqueous ammonia to heat and pressure without the aid of a catalyst, the heating being to a temperature in the neighborhood of 300° C.

4. A method of preparing a naphthylamine which comprises heating a naphthol and non-aqueous ammonia under pressure and without the aid of a catalyst to a temperature between 300° C. and 325° C.

5. A method of preparing beta beta dinaphthylamine which comprises subjecting beta naphthol and non-aqueous ammonia to heat and pressure without the use of a catalyst, the heating being to a temperature in the neighborhood of 300° C.

6. A method of preparing a dinaphthylamine which comprises subjecting a naphthol and ammonia to a temperature of about 300 degrees C. in a closed vessel in the absence of a catalyst.

7. A method of preparing beta beta dinaphthylamine which comprises subjecting beta naphthol and non-aqueous ammonia to temperatures ranging from about 300 degrees to 325 degrees C. in the absence of a catalyst.

8. A method of preparing beta beta dinaphthylamine which comprises subjecting beta naphthol and ammonia to temperatures ranging from about 300 degrees to 325 degrees C. at a pressure of from approximately 400 to 600 pounds per square inch without the aid of a catalyst.

9. A method of preparing alpha alpha dinaphthylamine which comprises subjecting liquid alpha naphthol and non-aqueous ammonia to temperatures ranging from about 300 degrees to 325 degrees C. without the aid of a catalyst.

10. A method of preparing dinaphthylamines which consists in condensing ammonium naphtholates with naphthols.

11. A method of preparing beta beta dinaphthylamine which consists in condensing ammonium beta naphtholates with beta naphthol.

12. A method of preparing dinaphthylamines which comprises heating a mixture of ammonium naphtholate and a naphthol to a temperature in the neighborhood of 300° C.

13. A method of preparing beta beta dinaphthylamine which consists in heating a mixture of ammonium beta naphtholate and beta naphthol to a temperature in the neighborhood of 300° C.

14. A method of preparing alpha alpha dinaphthylamine which consists in heating a mixture of ammonium alpha naphtholate and alpha naphthol to a temperature in the neighborhood of 300° C.

In witness whereof, I have hereunto signed my name.

Signed at Akron, in the county of Summit, and State of Ohio, this 1st day of May, 1928.

ALBERT M. CLIFFORD.